United States Patent
Ren (10) Patent No.: US 10,542,112 B2
(45) Date of Patent: Jan. 21, 2020

(54) MANAGEABLE OBJECT PROCESSING METHOD AND DEVICE

(71) Applicant: Tencent Technology (Shenzhen) Company Limited, Shenzhen, Guangdong (CN)

(72) Inventor: Jie Ren, Guangdong (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 81 days.

(21) Appl. No.: 15/857,150

(22) Filed: Dec. 28, 2017

(65) Prior Publication Data

US 2018/0124202 A1    May 3, 2018

Related U.S. Application Data

(63) Continuation of application No. PCT/CN2016/089787, filed on Jul. 12, 2016.

(30) Foreign Application Priority Data

Jul. 13, 2015   (CN) .......................... 2015 1 0410168

(51) Int. Cl.
*H04L 29/08* (2006.01)
*G06F 16/18* (2019.01)
(Continued)

(52) U.S. Cl.
CPC .... *H04L 67/2852* (2013.01); *G06F 15/17306* (2013.01); *G06F 16/1865* (2019.01); *G06Q 20/322* (2013.01)

(58) Field of Classification Search
None
See application file for complete search history.

(56) References Cited

U.S. PATENT DOCUMENTS

| 2003/0045267 A1* | 3/2003 | Himmel | ............... H04M 15/00 |
| | | | 455/406 |
| 2006/0287004 A1* | 12/2006 | Fuqua | ............... G06Q 20/0658 |
| | | | 455/558 |

(Continued)

FOREIGN PATENT DOCUMENTS

| CN | 102136170 A | 7/2011 |
| CN | 102419846 A | 4/2012 |
| CN | 103489098 A | 1/2014 |

OTHER PUBLICATIONS

International Search Report of the ISA, Haidian District, Beijing, regarding International Application No. PCT/CN2016/089787, dated Sep. 27, 2016. English translation provided by http://globaldossier.uspto.gov.

*Primary Examiner* — Philip J Chea
*Assistant Examiner* — Hassan A Khan
(74) *Attorney, Agent, or Firm* — Harness, Dickey & Pierce, P.L.C.

(57) ABSTRACT

A method and a device for processing a disposable object are provided. The method includes: generating pseudo manageable object change information in response to a user-initiated pseudo manageable object managing request; sending the pseudo manageable object change information to a target terminal having a communication connection with the terminal; changing the status information of the pseudo manageable object of the login account of the terminal based on the pseudo manageable object change information; and sending a manageable object update request to an online server in a case that the terminal is detected to be connected to the online server.

6 Claims, 8 Drawing Sheets

(51) Int. Cl.
*G06F 9/46* (2006.01)
*G06F 15/173* (2006.01)
*G06Q 20/32* (2012.01)

(56) References Cited

U.S. PATENT DOCUMENTS

| | | | |
|---|---|---|---|
| 2007/0255652 A1* | 11/2007 | Tumminaro | G06Q 20/10 705/39 |
| 2009/0030842 A1* | 1/2009 | Hoffman | G06Q 20/04 705/66 |
| 2012/0022981 A1* | 1/2012 | Morgenstern | G06Q 30/00 705/30 |
| 2012/0166337 A1* | 6/2012 | Park | G06Q 20/20 705/44 |
| 2013/0013353 A1* | 1/2013 | Fisher | G06Q 20/20 705/5 |
| 2013/0226796 A1* | 8/2013 | Jiang | G06Q 20/0655 705/44 |
| 2015/0046337 A1* | 2/2015 | Hu | G06Q 20/0658 705/65 |
| 2016/0180317 A1* | 6/2016 | Cozens | G06Q 20/223 705/39 |

* cited by examiner

Figure 9

MANAGEABLE OBJECT PROCESSING METHOD AND DEVICE

The present application is a continuation of International Patent Application No. PCT/CN2016/089787 filled on Jul. 12, 2016, which claims priority to Chinese Patent Application No. 201510410168.4, titled "MANAGEABLE OBJECT PROCESSING METHOD AND DEVICE", filed on Jul. 13, 2015, with the State Intellectual Property Office of the People's Republic of China, both of which are incorporated herein by reference in their entireties.

TECHNICAL FIELD

The present disclosure relates to the technical field of data processing, and in particular to a method and a device for processing a manageable object.

BACKGROUND

A manageable object may be understood as a class of target objects that may be managed by a person. Different users may achieve certain purposes through the exchanging and managing of the target objects.

Nowadays, manageable objects are commonly processed based on third-party agencies that are approved by the public. The general process is as follows. User A sends an object managing request to an online server provided by a third-party agency, requesting to transfer a certain amount of objects to user B. The online server processes the request upon receipt by taking out the certain amount of objects from the account of user A, and transferring the certain amount of objects to the account of user B. For example, the manageable object is call duration. User A sends a call duration managing request to the online server provided by a communication company, requesting for transferring the call duration of 100 minutes to user B. After receiving the request, the online server subtracts the call duration of 100 minutes from the account of user A, and adds the call duration of 100 minutes to the account of user B.

SUMMARY

A method and a device for processing a manageable object are provided. The specific solutions are as follows.

A method for processing a manageable object, applied to a terminal, is provided according to an embodiment of the disclosure. The method includes:

generating, by a first terminal, pseudo manageable object change information in response to a user-initiated pseudo manageable object managing request, where a pseudo manageable object is a substitution for a manageable object in an offline processing, and a correspondence relationship between the pseudo manageable object and the manageable object is preset;

sending, by the first terminal, the pseudo manageable object change information to a second terminal having a communication connection with the first terminal;

changing, by the first terminal, the status information of the pseudo manageable object of the login account of the first terminal based on the pseudo manageable object change information; and changing, by the second terminal, the status information of the pseudo manageable object of the login account of the second terminal based on the pseudo manageable object change information; and sending, by the first terminal, a first manageable object update request to an online server when the first terminal is detected to be connected to the online server, where the first manageable object update request carries the login account of the first terminal and the status information of the pseudo manageable object of the login account of the first terminal, and the online server updates status information of the manageable object of the login account of the first terminal stored in the online server based on the preset correspondence relationship in response to the first manageable object update request; and sending, by the second terminal, a second manageable object update request to the online server when the second terminal is detected to be connected to the online server, where the second manageable object update request carries the login account of the second terminal and the status information of the pseudo manageable object of the login account of the second terminal, and the online server updates status information of the manageable object of the login account of the second terminal stored in the online server based on the preset correspondence relationship in response to the second manageable object update request.

Another method for processing a manageable object, which is applied to an online server, is provided according to an embodiment of the disclosure. The method includes:

receiving a manageable object update request sent by a terminal, where the manageable object update request carries a login account of the terminal and status information of a pseudo manageable object of the login account of the terminal;

querying a preset correspondence relationship between the pseudo manageable object and a manageable object; and updating status information of the manageable object of the login account of the terminal based on the preset correspondence relationship and the manageable object update request.

A device for processing a manageable object, applied to a terminal, is provided according to an embodiment of the disclosure. The device includes a processor and a storage medium storing computer executable instructions, and the processor when running the computer executable instructions performs the following operations:

generating pseudo manageable object change information in response to a user-initiated pseudo manageable object managing request, where a pseudo manageable object is a substitution for a manageable object in an offline processing, and a correspondence relationship between the pseudo manageable object and the manageable object is preset;

sending the pseudo manageable object change information to a target terminal having a communication connection with the terminal, where the pseudo manageable object change information is for changing status information of the pseudo manageable object of a login account of the terminal and status information of the pseudo manageable object of a login account of the target terminal;

changing the status information of the pseudo manageable object of the login account of the terminal based on the pseudo manageable object change information; and sending a manageable object update request to an online server when the terminal is detected to be connected to the online server, where the manageable object update request carries the login account of the terminal and the status information of the pseudo manageable object of the login account of the terminal, and the online server updates status information of the manageable object of the login account of the terminal stored in the online server based on the preset correspondence relationship in response to the manageable object update request.

Another device for processing a manageable object, which is applied to an online server, is provided according to an embodiment of the disclosure. The device includes a processor and a storage medium storing computer-executable instructions, and the processor when running the computer executable instructions performs the following steps:

receiving a manageable object update request sent by a terminal, where the manageable object update request carries a login account of the terminal and status information of a pseudo manageable object of the login account of the terminal;

querying a preset correspondence relationship between the pseudo manageable object and a manageable object; and updating status information of the manageable object of the login account of the terminal based on the preset correspondence relationship and the manageable object update request.

As can be seen from the above mentioned technical solution, in the method for processing the manageable object according to the embodiments of the present disclosure, the online server stores the state information of the manageable object of the account, such as the remaining time of the call duration of the account. Each account is assigned with a pseudo manageable object. The pseudo manageable object may be regarded as the alternative of the manageable object when being managed offline, and the correspondence relationship between the pseudo manageable object and manageable object is preset, for example, one unit of pseudo manageable object is equivalent to two units of manageable objects. In the offline environment, in a case that a user initiates the pseudo object managing request, the pseudo manageable object change information is generated, and different terminals may receive and send the pseudo manageable object change information through the near-field communication, and change the status information of the pseudo manageable object of the current login account of the terminal based on the pseudo manageable object change information. In a case that the terminal is detected to be connected to the online server, the terminal sends the manageable object update request of the account to the online server, and the online server updates the status information of the manageable object of the login account of the terminal stored in the online server, based on the status information of the pseudo manageable object of the login account of the terminal and based on the preset correspondence relationship between the status information of pseudo manageable object and the status information of the manageable object. Therefore, the terminal may manage the object under the condition that the terminal is disconnected from the network, which facilitates the normal use for the user.

DETAILED DESCRIPTION OF THE EMBODIMENTS

The technical solution of the embodiments of the present application is described clearly and comprehensively in conjunction with drawings. Apparently, the described embodiments are merely part of, not all of, the embodiments. Based on the embodiments of the disclosure, all other embodiments obtained by those of ordinary skill in the art without creative work fall within the scope of protection of the disclosure.

Figure 1:
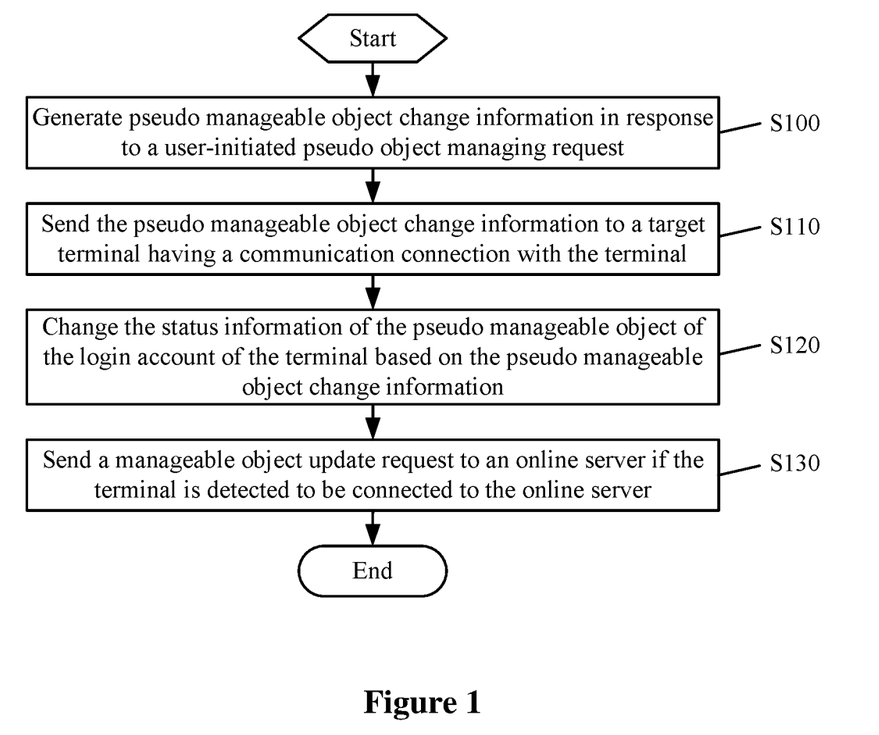
FIG. 1 is a flow chart of a method for processing a manageable object according to an embodiment of the disclosure.

The method for processing a manageable object according to an embodiment of the disclosure is applied to the object processing between different terminals and between a terminal and an online server. In the present embodiment, the solution is described with respect to the terminal which initiates the object managing request. Referring to FIG. 1, a flow chart of a method for processing a manageable object according to an embodiment of the disclosure is shown. The method may be applied to a terminal such as a mobile phone or a tablet computer.

As shown in FIG. 1, the method includes steps S100 to S130.

In step S100, pseudo manageable object change information is generated in response to a user-initiated pseudo object managing request.

The online server stores status information of the manageable object for an account. The manageable object may be call duration, an amount of savings, etc. In a case that the manageable object is the call duration, the status information of the manageable object is the remaining time of the call duration.

The so-called pseudo manageable object may be regarded as an alternative for the manageable object when being managed offline. There is a correspondence relationship between the manageable object and the pseudo manageable object. For example, one unit of pseudo manageable object may be equivalent to two units of manageable objects. For example, in some corporate canteens, it is agreed that "one electronic ticket"="three bread"="one vegetarian dish". Here, the "electronic ticket" may be considered as a pseudo manageable object, and the "bread" and "vegetarian dish" represents the manageable object.

Apparently, the term of "pseudo manageable object" is simply defined for convenience of expression, and should not be construed as limiting the scope of the technical solution.

Further, the generated pseudo manageable object change information indicates the amount of pseudo manageable objects that are transferred from the current account, and may also be understood as the amount of pseudo manageable objects that are transferred to another account. The concept of amount here depends on the type of unit of the pseudo manageable object, for example, if the pseudo manageable object is the electronic ticket, the unit is "piece".

In step S110, the pseudo manageable object change information is sent to a target terminal having a communication connection with the terminal.

For example, the pseudo manageable object change information is used to change the status information of the pseudo manageable object for the login account of the target terminal.

In the present embodiment, the two terminals that process the manageable object are not limited to being connected to the network, but merely have to establish communication connection such as Bluetooth communication, NFC communication, infrared communication or communication in the same local area network.

Here, the target terminal is the terminal corresponding to the account to which the user wants to transfer the pseudo manageable object. For example, account A logs in to terminal 1 and account B logs in to terminal 2. If the user now uses account A to transfer a certain amount of manageable objects to account B, terminal 2 is the target terminal for terminal 1.

In step S120, status information of the pseudo manageable object of the login account of the terminal is changed based on the pseudo manageable object change information.

For example, since the login account of the terminal is a party that expends the pseudo manageable object, the value of the pseudo manageable object of the login account is reduced through changing the status information of the pseudo manageable object. In contrast, for the account that receives the pseudo manageable object change information, the value of the pseudo manageable object of the account is increased through changing the status information of the pseudo manageable object.

In the present embodiment, the value of pseudo manageable object of an account is represented by the status information, and the status information may be represented in multiple ways, for example, different sequence codes represents different values of pseudo manageable objects, or different amounts of marks (such as "circular plate" icons) represent different values of pseudo manageable objects.

In step S130, in a case that the terminal is detected to be connected to the online server, a manageable object update request is sent to the online server.

For example, the manageable object update request carries a current login account of the terminal and the status information of the pseudo manageable object of the login account. The manageable object update request is used for the online server to update the status information of the manageable object of the current login account of the terminal stored in the online server, based on a pre-stored correspondence relationship between the status information of pseudo manageable object and the status information of the manageable object.

The status of the pseudo manageable object of an account is changed through trading the pseudo manageable object between different accounts, which may be understood as that the value of the pseudo manageable object of the account is changed. In a case that the terminal is connected to the online server, the terminal uploads the login account of the terminal and the status information of pseudo manageable object to the online server. The online server determines the status information of the corresponding manageable object based on the status information of the pseudo manageable object of the account, and updates the status information of the manageable object of the account stored in the online server to be the determined status information of the manageable object.

In a case that the terminal is connected to the online server, the terminal may send the manageable object update request actively, or the online server sends the update request to the terminal first, and then the terminal uploads the manageable object update request, which is not limited herein.

In the method for processing the manageable object according to the embodiment of the disclosure, the online server stores the status information of the manageable object of the account. Each account is assigned with a pseudo manageable object, which may be regarded as the alternative for the manageable object when being managed offline. The correspondence relationship between the pseudo manageable object and the manageable object is preset, for example, one unit of pseudo manageable object may be equivalent to two units of manageable objects. In the offline environment, in a case that the user initiates the pseudo object managing request, the pseudo manageable object change information is generated. Different terminals may be connected to each other through the inter-terminal communication, such as near-field communication, Bluetooth communication, etc., to send and receive the pseudo manageable object change information, and to change the status information of the pseudo manageable object of the login accounts of the terminals based on the pseudo manageable object change information. In a case that the terminal is detected to be connected to the online server, the terminal sends the manageable object update request of the account to the online server, and the online server updates the status information of the manageable objects of the login account of the terminal stored in the online server, based on the status information of the pseudo manageable object of the login account of the terminal and based on the preset correspondence relationship between the status information of pseudo manageable object and the status information of the manageable object. Therefore, the terminal may manage the object under the condition that the terminal is disconnected from the network, which facilitates the normal use for the user.

Further, for better understanding, the technical solution is illustrated through a specific application scenario.

User A travels to a remote mountain area, and wants to buy goods with a price of RMB100 Yuan from a merchant B in the local market. But user A has no cash, and there is no network signal at that place, so that user A is not able to access the network via the mobile phone.

According to the technical solution of the disclosure, both user A and user B activates the service of virtual currency payment for their bank accounts. Assuming that there is RMB1000 Yuan in the bank account of user A, there are initially 100 virtual currency (here, assuming 1 virtual currency=RMB10 Yuan) in the bank account of user A. User A uses the mobile phone to establish the Bluetooth communication with mobile phone of the merchant B, initials the transfer request to transfer 10 virtual currency. The virtual currency change information is generated and sent to the mobile phone of user B, and thus 10 virtual currency is reduced from the bank account of user A and 10 virtual currency is added to the bank account of user B under the control of the virtual currency change information.

At this point, user A obtains the desired goods by paying 10 virtual currency to the merchant, and the merchant B obtains 10 virtual currency through the sale of the goods.

In a case that the mobile phone of user A or user B is connected to the server, for example, the mobile phone of user A or user B may be connected to the Internet, the amount of virtual currency of the account may be uploaded to the online bank server. The bank server updates the amount of money in the account based on the amount of virtual currency in the corresponding account. Taking user A as an example, since 90 virtual currency is left in the account, the bank server deducts RMB100 Yuan from the account of user A, and thus RMB900 Yuan remains.

Alternatively, after step S110, step S120 may be performed only after receiving the information that the status information of pseudo manageable object is changed successfully which is fed back by the target terminal, thereby protecting the interests of users.

Of course, if the above-mentioned content is not taken into account, the execution order of steps S110 and S120 is not limited to the order in the first embodiment, and may be reversed or executed in parallel.

Figure 2:
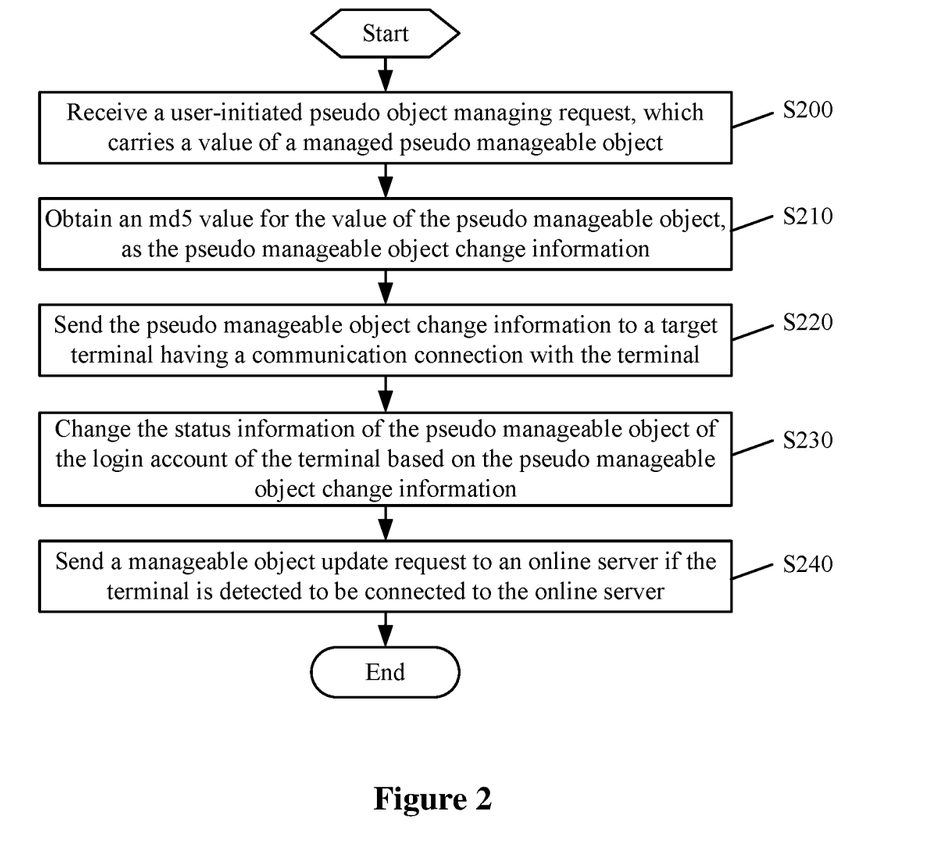
FIG. 2 is a flow chart of a method for processing a manageable object according to another embodiment of the disclosure.

In another embodiment of the disclosure, another method for processing a manageable object is disclosed. The method may be applied to terminals such as mobile phones, tablet computers, and the like. As shown in FIG. 2, the method includes steps S200 to S240.

In step S200, a user-initiated pseudo object managing request is received, which carries a value of the managed pseudo manageable object.

In step S210, a md5 value is obtained for the value of the pseudo manageable object, as the pseudo manageable object change information.

For example, in this step, the md5 value is obtained for the value of the pseudo manageable object according to a preset md5 algorithm, and the result serves as the pseudo manageable object change information. By obtaining the md5 value, the safety of the data is achieved, avoiding the forgery of pseudo manageable object change information.

In step S220, the pseudo manageable object change information is sent to a target terminal having a communication connection with the terminal.

For example, the pseudo manageable object change information is used to change the status information of the pseudo manageable object of the current login account of the target terminal.

Since the pseudo manageable object change information in the present embodiment is the encrypted information, the target terminal decrypts the information with a preset decryption algorithm corresponding to the encryption algorithm, and then changes status information of the pseudo manageable object of the current login account of the target terminal.

In step S230, the status information of the pseudo manageable object of the login account of the target terminal is changed based on the pseudo manageable object change information.

In step S240, in a case that the terminal is detected to be connected to an online server, a manageable object update request is sent to the online server.

For example, the manageable object update request may carry the login account of the terminal and the status information of the pseudo manageable object of the login account of the terminal.

Compared with the previous embodiment, the process of encrypting the value of the pseudo manageable object by obtaining the md5 value is introduced in the present embodiment, thereby achieving the security of the data and avoiding the forgery of the pseudo manageable object change information.

Figure 3:
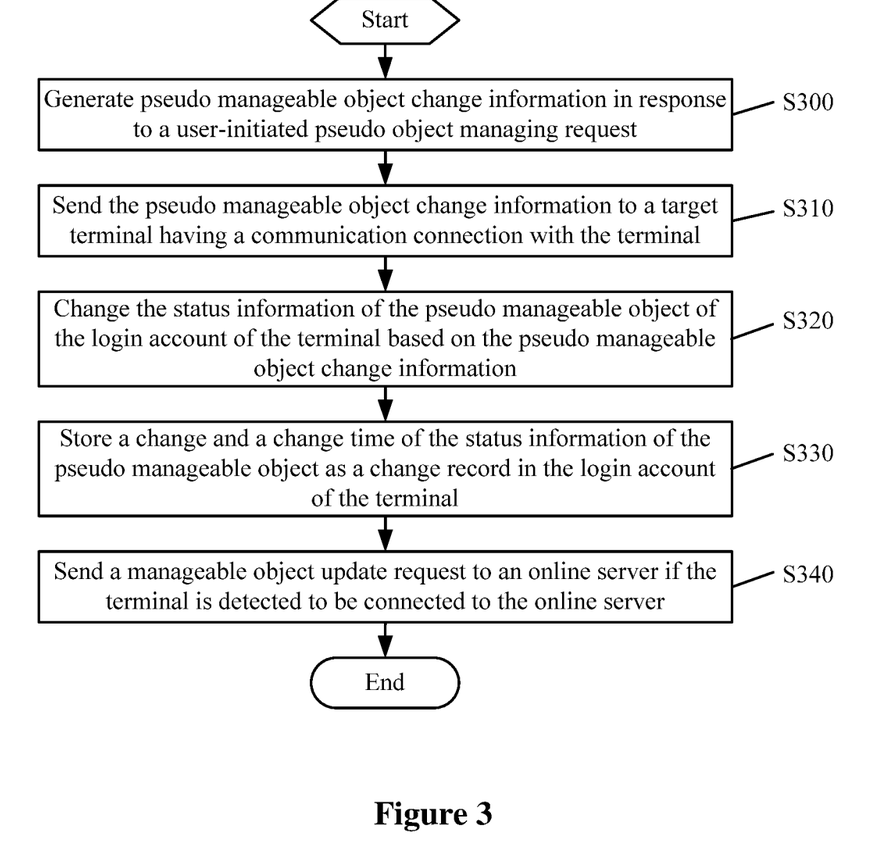
FIG. 3 is a flow chart of a method for processing a manageable object according to still another embodiment of the disclosure.

In still another embodiment of the disclosure, a method for processing a manageable object is further disclosed. The method may be applied to terminals such as mobile phones, tablet computers and the like.

As shown in FIG. 3, the method includes steps S300 to S340.

In step S300, pseudo manageable object change information is generated in response to a user-initiated pseudo object managing request.

The online server stores the status information of the manageable object for an account, and the manageable object may be call duration, an amount of savings, etc. In a case that the manageable object is the call duration, the status information of the manageable object is the remaining time of the call duration.

In step S310, the pseudo manageable object change information is sent to a target terminal having a communication connection with the terminal.

For example, the pseudo manageable object change information is used to change the status information of the pseudo manageable object for the current login account of the target terminal.

In the present embodiment, the two terminals that process the manageable object are not limited to being connected to the network, but merely have to establish communication connection such as Bluetooth communication, NFC communication, infrared communication or communication in the same local area network.

In step S320, status information of the pseudo manageable object of the login account of the terminal is changed based on the pseudo manageable object change information.

In step S330, a change and a change time of the status information of the pseudo manageable object are stored as a change record in the login account of the terminal.

For example, for the login account of the terminal, each change made to the status information is stored as a change record for subsequent check.

In step S340, in a case that the terminal is detected to be connected to an online server, a manageable object update request is sent to the online server.

For example, the manageable object update request carries the login account of the terminal and the status information of the pseudo manageable object of the login account of the terminal.

In the present embodiment, the step of recording the change of the status information of the login account of the terminal is further introduced, so as to provide data for the server to check the bill subsequently.

Figure 4:
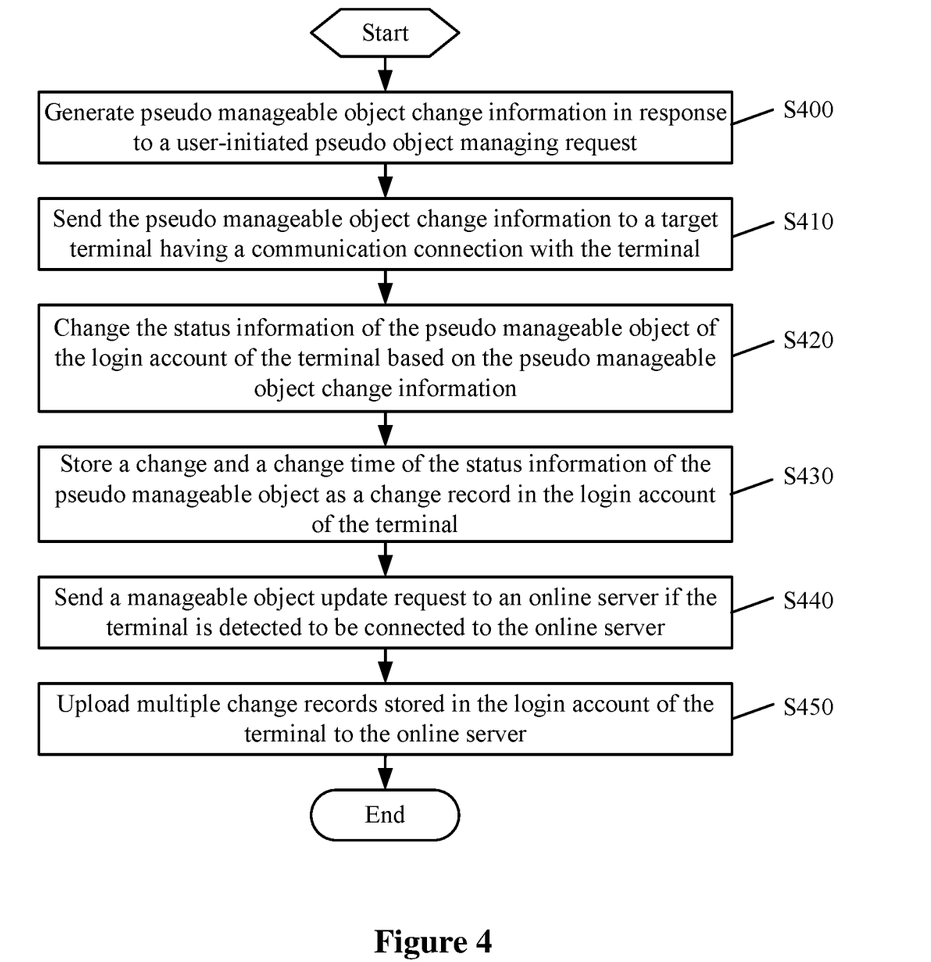
FIG. 4 is a flow chart of a method for processing a manageable object according to yet another embodiment of the disclosure.

Based on the above-described embodiment, another method for processing a manageable object is provided. The method may be applied to terminals such as mobile phones or tablet computers.

As shown in FIG. 4, the method includes steps S400 to S450.

In step S400, pseudo manageable object change information is generated in response to a user-initiated pseudo object managing request.

The online server stores status information of the manageable object for the account. The manageable object may be call duration, an amount of savings, etc. In a case that the manageable object is the call duration, the status information of the manageable object is the remaining time of the call duration.

In step S410, the pseudo manageable object change information is sent to a target terminal having a communication connection with the terminal.

For example, the pseudo manageable object change information is used to change the status information of the pseudo manageable object of the login account of the target terminal.

In the present embodiment, the two terminals that process the manageable object are not limited to being connected to the network, but merely have to establish communication connection such as Bluetooth communication, NFC communication, infrared communication or communication in the same local area network.

In step S420, status information of the pseudo manageable object of the login account of the terminal is changed based on the pseudo manageable object change information.

In step S430, a change and a change time of the status information of the pseudo manageable object are stored as a change record in the login account of the terminal.

For example, for the login account of the terminal, each change made to the status information is stored as a change record for subsequent check.

In step S440, in a case that the terminal is detected to be connected to an online server, a manageable object update request is sent to the online server.

For example, the manageable object update request may carry the current login account of the terminal and the status information of the pseudo manageable object of the login account of the terminal.

In step S450, multiple change records stored in the login account of the terminal are uploaded to the online server.

The change records are uploaded for the online server to check the status information of pseudo manageable object of the current login account of the terminal.

Of course, the change records may be uploaded to the online server together with the manageable object update request in step S440.

In the present embodiment, the change records of the current login account of the terminal are uploaded to the online server, so that the online server may check the status information of the pseudo manageable object of the account based on original status information of the manageable object of the account, currently uploaded status information of the pseudo manageable object of the account, and the change records of the account. For example, the online server records that there are RMB100 Yuan in account A. After a period of time, the user trades 5 virtual gold coins offline (assuming one virtual gold coin=RMB10 Yuan), and thus 5 virtual gold coins remain, which correspond to the change record recorded in the account A. After the network is accessed, the information of the 5 remaining virtual gold coins of the account A and the change record that "5 virtual gold coins are transferred out" are uploaded to the online server. After checking, the online server finds that there are 10 virtual gold coins originally in account A, 5 virtual gold coins remain now, and the change record is "5 virtual gold coins are transferred out". Therefore, the virtual gold coins are checked to be correct, which indicates that account A does not forge virtual gold coins.

The above-described embodiment illustrates the solution of the disclosure from the perspective of terminal, and then the solution of the disclosure is further described from the perspective of online server.

Figure 5:
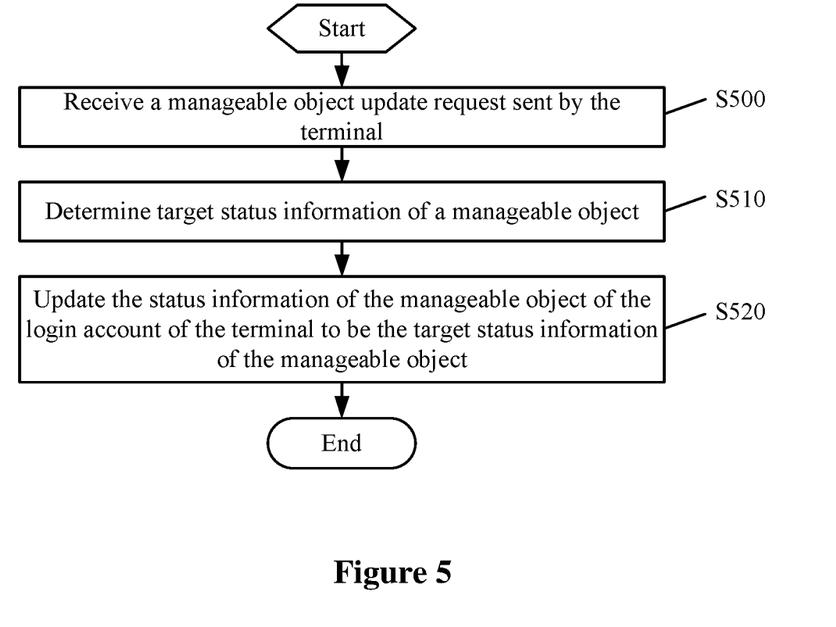
FIG. 5 is a flow chart of a method for processing a manageable object according to another embodiment of the disclosure.

Referring to FIG. 5, a flow chart of a method for processing a manageable object is disclosed according to an embodiments of the disclosure.

As shown in FIG. 5, the method includes steps S500 to S520.

In step S500, a manageable object update request sent by the terminal is received.

The online server may establish a connection with the terminal through the Internet or the like, and the manageable object update request carries the current login account of the terminal and the status information of the pseudo manageable object of the current login account of the terminal.

In step S510, target status information of a manageable object is determined.

For example, the status information of the manageable object corresponding to the status information of the pseudo manageable object which is carried by the manageable object update request, is determined as the target status information of the manageable object, by querying a preset correspondence relationship between the status information of the pseudo manageable object and the status information of the manageable object.

In step S520, the status information of the manageable object of the login account of the terminal is updated to the target status information of the manageable object.

In the present embodiment, the terminal uploads the manageable object update request after being connected to the online server, and the online server updates the status information of the manageable object of the login account of the terminal, thereby ensuring correct status of the manageable object.

The processing of the above-mentioned online server is described with an example.

After the terminal accesses the network, the information of the current login account A of the terminal and the corresponding 10 virtual gold coins that remain are uploaded. The online server queries the conversion relationship (assuming one virtual gold coin=RMB10 Yuan) between the virtual currency and the RMB currency, and determines the target amount of money as 10*10=RMB 100 Yuan. Further, the amount of money of account A is updated to be RMB100 Yuan in the online server.

Figure 6:
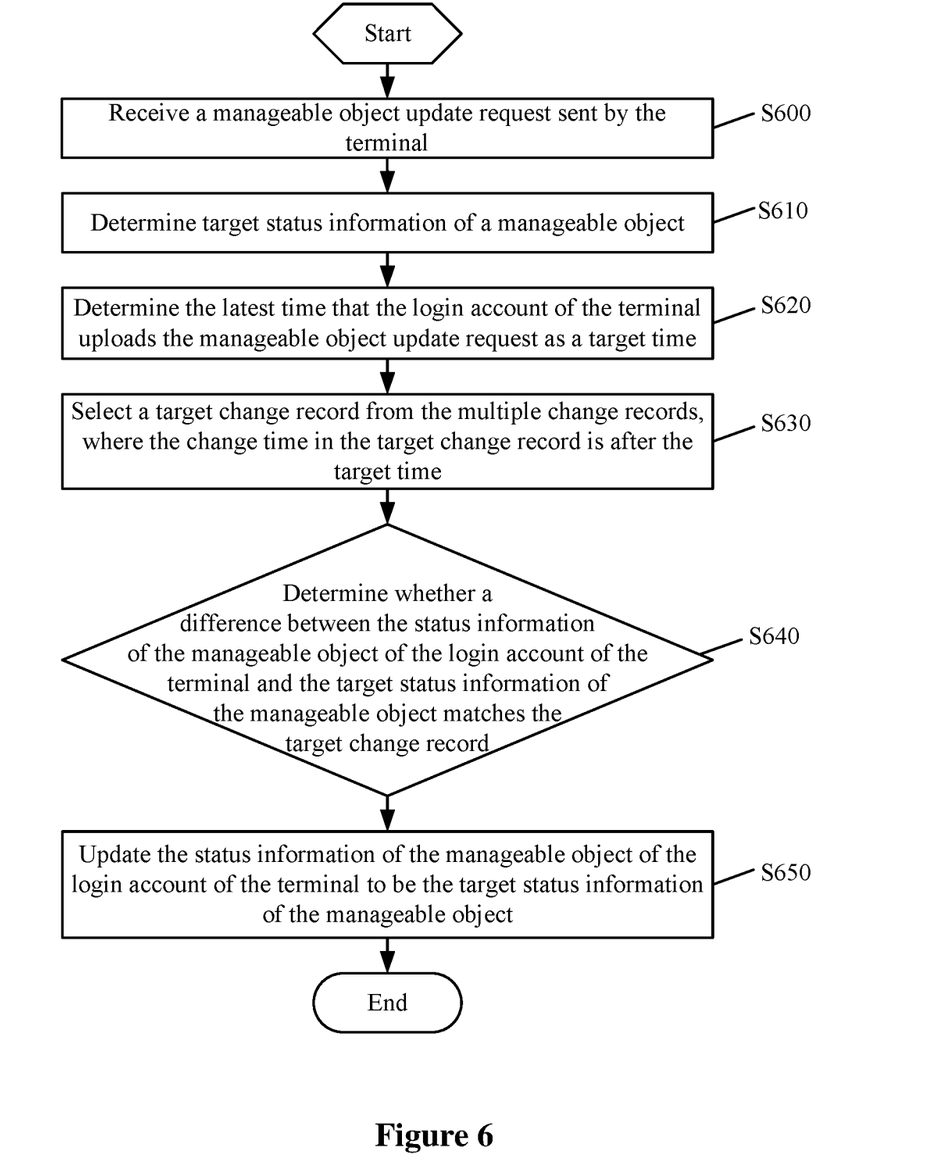
FIG. 6 is a flow chart of a method for processing a manageable object according to another embodiment of the disclosure.

In another embodiment of the disclosure, another method for processing a manageable object is disclosed from the perspective of online server. Reference is made to FIG. 6.

In the present embodiment, it is assumed that the terminal-uploaded manageable object update request also includes several change records stored in the login account of the terminal. As shown in FIG. 6, the method includes steps S600 to S650.

In step S600, a manageable object update request sent by a terminal is received.

The online server may establish a connection with the terminal through the Internet or the like, and the manageable object update request carries the current login account of the terminal and the status information of the pseudo manageable object of the current login account of the terminal.

In step S610, target status information of a manageable object is determined.

For example, the status information of the manageable object corresponding to the status information of the pseudo manageable object which is carried by the manageable object update request, is determined as the target status information of the manageable object, by querying the preset correspondence relationship between the status information of the pseudo manageable object and the status information of the manageable object.

In step S620, the latest time that the login account of the terminal uploads the manageable object update request is determined as a target time.

In step S630, a target change record is selected from the multiple change records. The change time in the target change record is after the target time.

For example, the multiple change records uploaded by the terminal may include multiple different change time, and only a change record with the change time after the target time is selected in this step. For example, the current time is Jul. 6, 2015, and the target time is Jun. 6, 2015, then only the change records with the change time in the range of Jun. 6, 2015 to Jul. 6, 2015 are selected.

In step S640, it is determined whether the difference between the status information of the manageable object of the login account of the terminal and the target status information of the manageable object matches the target change record.

The sum of the values of the target change records is calculated for the determination. Since the change records recorded by the terminal is the status information of the pseudo manageable object, the sum of the values of the target change records may be converted into status information of the manageable object, and then the determination is performed.

For example, the status information of the manageable object of the current login account of the terminal is RMB100 Yuan, and the target status information of the manageable subject is RMB50 Yuan. The target change record includes "3 virtual gold coins are transferred out", "7 virtual gold coins are transferred out", and "5 virtual gold coins are transferred in", then the sum of the values of the target change records is −3−7+5=−5 virtual gold coins. Assuming one virtual gold coin=RMB10 Yuan, −5 virtual gold coins are converted into RMB-50 Yuan. Apparently, 50−100=−50 Yuan, which indicates that the difference between the status information of the manageable object of the current login account of the terminal and the target status information of the manageable object coincides with the target change record.

If the determination is positive, step S650 is performed, and if the determination is negative, the manageable object update request is ignored, and the process ends.

In step S650, the status information of the manageable object of the login account of the terminal is updated to be the target status information of the manageable object.

Step S650 is executed only if the above-mentioned determination is positive. Otherwise, it is considered that there is an illegal behavior with regard to the login account, and the request is ignored, or an alarm is given.

In the present embodiment, the process of checking the status information of the manageable object of the account is introduced to the online server, thereby ensuring the correctness of the data.

The device for processing a manageable object according to the present embodiment of the disclosure is described below, and the device for processing a manageable object described below and the method for processing a manageable object described above may be referred to each other.

Figure 7:
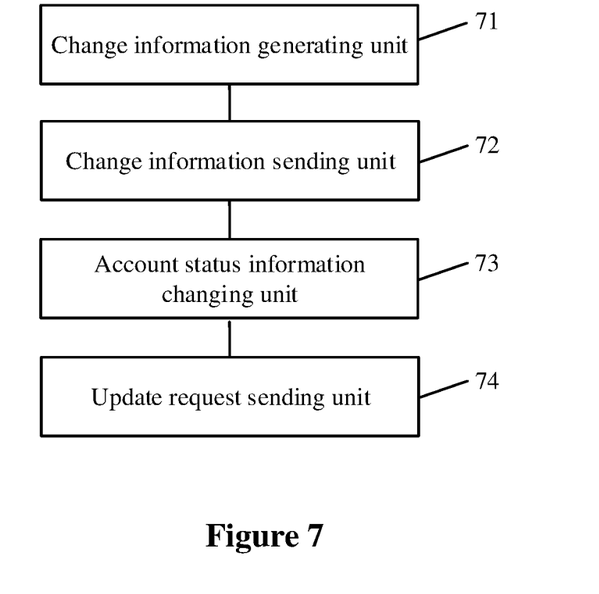
FIG. 7 is a structural diagram of a device for processing a manageable object introduced from the perspective of a terminal according to an embodiment of the disclosure.

Referring to FIG. 7, a structural diagram of a device for processing a manageable object from the perspective of a terminal is shown.

As shown in FIG. 7, the device includes a change information generating unit 71, a change information sending unit 72, an account status information changing unit 73, and an update request sending unit 74.

The change information generating unit 71 is configured to generate pseudo manageable object change information in response to a user-initiated pseudo object managing request.

The change information sending unit 72 is configured to send the pseudo manageable object change information to a target terminal having a communication connection with the terminal. The pseudo manageable object change information is for changing status information of the pseudo manageable object of a login account of the target terminal.

The account status information changing unit 73 is configured to change the status information of the pseudo manageable object of the login account of the terminal based on the pseudo manageable object change information.

The update request sending unit 74 is configured to send a manageable object update request to an online server in a case that the terminal is detected to be connected to the online server. The manageable object update request carries the login account of the terminal and the status information of the pseudo manageable object of the login account of the terminal. The manageable object update request is for the online server to update the status information of the manageable objects of the login account of the terminal stored in the online server, based on a preset correspondence relationship between the status information of pseudo manageable object and the status information of the manageable object.

Optionally, the user-initiated pseudo object managing request may carry the amount of managed pseudo manageable objects, and the change information generating unit may include a first change information generating subunit.

The first change information generating subunit is configured to obtain an md5 value for the amount of pseudo manageable objects, as the pseudo manageable object change information.

Optionally, the device for processing a manageable object may further include a change recording unit.

The change recording unit is configured to store, after the status information of the pseudo manageable object of the login account of the terminal is changed based on the pseudo manageable object change information, the change and a change time of the status information change of the pseudo manageable object as a change record in the current login account of the terminal.

Based on the above, the update request sending unit may further be configured to upload multiple change records stored in the login account of the terminal to the online server, so that the online server checks the status information of the pseudo manageable object of the login account of the terminal.

With the device for processing a manageable object according to the embodiment of the disclosure, when a user initiates a pseudo object managing request, a pseudo manageable object change information is generated. An inter-terminal communication connection such as near-field communication and Bluetooth communication may be established between different terminals, so as to receive and send pseudo manageable object change information, and thus change the status information of the pseudo manageable object of the login account of the terminal based on the pseudo manageable object change information. In a case that the terminal is detected to be connected to the online server, the manageable object update request for the account is sent to the online server, and the online server updates, based on the status information of the pseudo manageable object of the login account of the terminal and based on the preset correspondence relationship between the status information of the pseudo manageable object and the status information of the manageable object, the status information of the manageable object of the login account of the terminal stored in the online server. Therefore, the terminal may manage the object under the condition that the terminal is disconnected from the network, which facilitates the normal use for the user.

Figure 8:
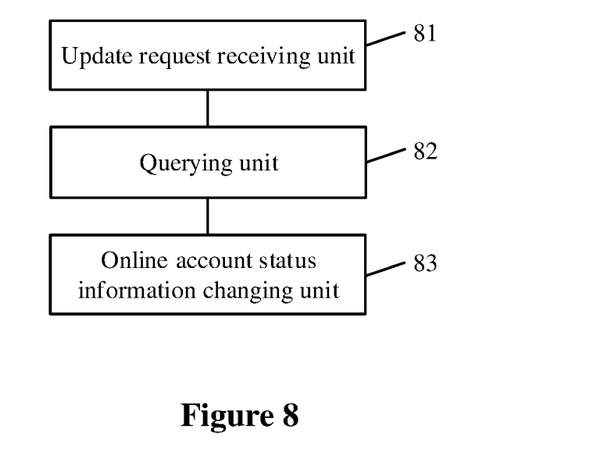
FIG. 8 is a structural diagram of a device for processing a manageable object introduced from the perspective of an online server according to an embodiment of the disclosure.

Referring to FIG. 8, a structural diagram of a device for processing a manageable object is show from the perspective of an online server.

As shown in FIG. 8, the device includes an update request receiving unit 81, a querying unit 82 and an online account status information changing unit 83.

The update request receiving unit 81 is configured to receive a manageable object update request sent by a terminal. The manageable object update request carries the login account of the terminal and the status information of the pseudo manageable object of the login account of the terminal.

The querying unit 82 is configured to query a preset correspondence relationship between the status information of the pseudo manageable object and the status information of the manageable object, to determine the status information of the manageable object corresponding to the status information of the pseudo manageable object carried by the manageable object update request, as target status information of the manageable object.

The online account status information changing unit 83 is configured to update the status information of the manageable object of the login account of the terminal, to be the target status information of the manageable object.

Optionally, the manageable object update request may also include multiple change records stored in the login account of the terminal. The device may further include a target time determining unit, a target change record selecting unit and a determining unit.

The target time determining unit is configured to determine, the latest time that the login account of the terminal uploads the manageable object update request, as the target time, before updating the status information of the manageable object of the login account of the terminal to be the target status information of the manageable object.

The target change record selecting unit is configured to select a target change record from the multiple change records. The change time in the target change record is after the target time.

The determining unit is configured to determine whether the difference between the status information of the manageable object of the login account of the terminal and the target status information of manageable object coincides with the target change record. If the determination is positive, the online account status information changing unit is triggered, and if the determination is negative, the online account status information changing unit is not triggered.

In the present embodiment, the terminal uploads the manageable object update request after accessing the network, so that the online server updates the status information of the manageable object of the login account of the terminal, thereby ensuring the correct status of the manageable object of the account.

Further, the process of checking the status information of the manageable object of the account is introduced to the online server, thereby ensuring the correctness of the data.

A system for processing a manageable object is further provided according to an embodiment of the disclosure. The system includes the above-described terminal and the online server. For illustration of the terminal and online server, the corresponding parts of the above description may be referred to, which is not repeat herein.

Figure 9:
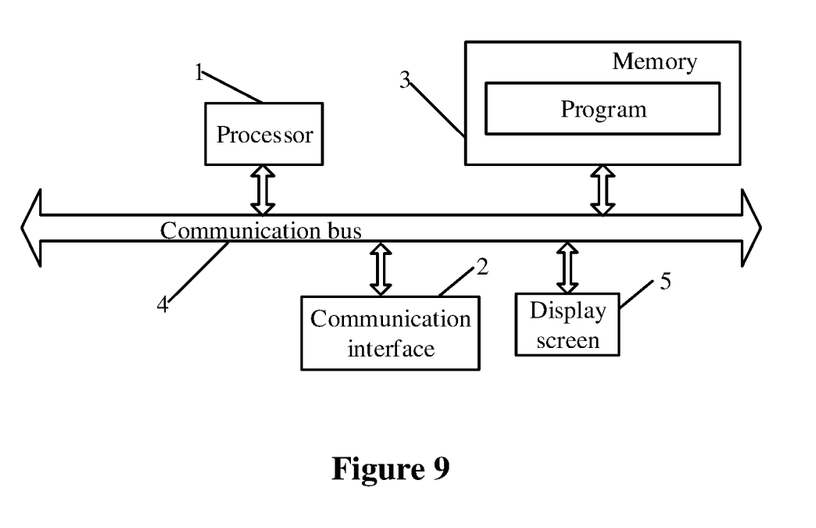
FIG. 9 is a diagram of hardware structure of an online server according to an embodiment of the disclosure.

The hardware structures of the terminal and the online server are basically similar. The online server is taken as an example for illustration in the present embodiment. Referring to FIG. 9, a diagram of hardware structure of an online server according to the embodiment of the disclosure is shown. As shown in FIG. 9, the online server may include: a processor 1, a communication interface 2, a memory 3, a communication bus 4, and a display screen 5.

The processor 1, the communication interface 2, the memory 3 and the display screen 5 communicate with each other through the communication bus 4.

Optionally, the communication interface 2 may be the interface of a communication module, such as the interface of a GSM module, the interface of a GPRS module, and the interface of an LTE module.

The processor 1 is configured to execute a program.

The memory 3 is configured to store the program.

The program may include program codes which includes operation instructions of the processor.

The processor 1 may be a central processing unit CPU, or an Application Specific Integrated Circuit (ASIC), or one or more integrated circuits configured to implement the embodiments of the present disclosure.

The memory 3 may include high-speed RAM memory, and may further include non-volatile memory (non-volatile memory), such as at least one disk memory.

The program may be specifically configured to:

receive a manageable object update request sent by a terminal, where the manageable object update request carries a login account of the terminal and status information of the pseudo manageable object of the login account of the terminal;

query a preset correspondence relationship between the status information of the pseudo manageable object and the status information of the manageable object, to determine the status information of the manageable object corresponding to the status information of the pseudo manageable object carried by the manageable object update request, as target status information of the manageable object; and update the status information of the manageable object of the login account of the terminal, to be the target status information of the manageable object.

Of course, the hardware structure of the terminal is similar to that of the online server, except that the programs stored in the memory is different. The programs stored in the memory of the terminal may be specifically configured to:

generate pseudo manageable object change information in response to a user-initiated pseudo object managing request;

send the pseudo manageable object change information to the target terminal having a communication connection with the terminal, where the pseudo manageable object change information is for changing the status information of the pseudo manageable object of a login account of the target terminal;

change the status information of the pseudo manageable object of the login account of the terminal based on the pseudo manageable object change information; and send a manageable object update request to the online server in a case that the terminal is detected to be connected to the online server, where the manageable object update request carries the login account of the terminal and the status information of the pseudo manageable object of the login account of the terminal, and the manageable object update request is for the online server to update the status information of the manageable objects of the login account of the terminal stored in the online server, based on a preset correspondence relationship between the status information of pseudo manageable object and the status information of the manageable object.

Finally, it should be further noted that, in this disclosure, the relational terms such as first and second are merely to distinguish one entity or operation from another entity or operation, not requiring or implying that there is any such actual relationship or sequence between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. In the absence of more restrictions, the elements defined by the statement "including a . . . " do not preclude the presence of additional elements in the process, method, article, or device including the elements.

The embodiments of the present disclosure is described in a progressive manner, each of which is focused on the differences from other embodiments, and for the same or similar parts of the various embodiments, the other embodiments may be referred to.

The foregoing description of the disclosed embodiments allows one skilled in the art to implement or use the present technical solution. Various modifications to these embodiments are apparent to those skilled in the art, and the generic principles defined herein may be embodied in other embodiments without departing from the spirit or scope of the present application. Accordingly, this technical solution is not limited to the embodiments shown herein, but is accordant to the widest scope consistent with the principles and novel features disclosed herein.

The invention claimed is:

1. A method for processing a manageable object, applied to a terminal, comprising:
    generating, by a first terminal, pseudo manageable object change information in response to a user-initiated pseudo manageable object managing request, wherein a pseudo manageable object is a substitution for a manageable object in an offline processing, and a correspondence relationship between the pseudo manageable object and the manageable object is preset;
    sending, by the first terminal, the pseudo manageable object change information to a second terminal having a communication connection with the first terminal;
    changing, by the first terminal, status information of the pseudo manageable object of a login account of the first terminal based on the pseudo manageable object change information, and storing, by the first terminal, a change and a change time of the status information of the pseudo manageable object, as a first change record, in the login account of the first terminal;
    changing, by the second terminal, the status information of the pseudo manageable object of the login account of the second terminal based on the pseudo manageable object change information, and storing, by the second terminal, the change and the change time of the status information of the pseudo manageable object, as a second change record, in the login account of the second terminal;
    sending, by the first terminal, a first manageable object update request to an online server and uploading, by the first terminal, the first change record stored in the login account of the first terminal to the online server when the first terminal is detected to be connected to the online server, wherein the online server checks the status information of the pseudo manageable object of the login account of the first terminal based on the first change record, wherein the first manageable object update request carries the login account of the first terminal and the status information of the pseudo manageable object of the login account of the first terminal, and the online server updates status information of the manageable object of the login account of the first terminal stored in the online server based on a preset correspondence relationship in response to the first manageable object update request; and
    sending, by the second terminal, a second manageable object update request to the online server and uploading, by the second terminal, the second change record stored in the login account of the second terminal to the online server when the second terminal is detected to be connected to the online server, wherein the online server checks the status information of the pseudo manageable object of the login account of the second terminal based on the second change record, wherein the second manageable object update request carries the login account of the second terminal and the status information of the pseudo manageable object of the login account of the second terminal, and the online server updates status information of the manageable object of the login account of the second terminal stored in the online server based on the preset correspondence relationship in response to the second manageable object update request.

2. The method according to claim 1, wherein the user-initiated pseudo manageable object managing request carries a value of the managed pseudo manageable object, and the generating pseudo manageable object change information comprises:
    obtaining, by the first terminal, an md5 value for the value of the pseudo manageable object, as the pseudo manageable object change information.

3. A method for processing a manageable object, applied to an online server, comprising:
    receiving a manageable object update request sent by a terminal, wherein the manageable object update request carries a login account of the terminal and status information of a pseudo manageable object of the login account of the terminal;
    receiving, from the terminal, change records stored in the login account of the terminal;
    querying a preset correspondence relationship between the pseudo manageable object and a manageable object;
    determining whether the status information of the pseudo manageable object of the login account of the terminal coincides with the change records; and
    if the determination is positive, updating status information of the manageable object of the login account of the terminal based on the preset correspondence relationship and the manageable object update request, and if the determination is negative, ignoring the manageable object update request.

4. The method according to claim 3, wherein
the determining whether the status information of the pseudo manageable object of the login account of the terminal is consistent with the change records comprises:
    determining target status information of the manageable object corresponding to the status information of the pseudo manageable object in the manageable object update request according to the preset correspondence relationship;
    determining a latest time that the login account of the terminal uploads the manageable object update request, as a target time;

selecting a target change record from the change records, wherein a change time in the target change record is after the target time; and determining whether a difference between the status information of the manageable object of the login account of the terminal and the target status information of the manageable object coincides with the target change record.

5. A device for processing a manageable object, applied to a terminal, wherein the device comprises a processor and a storage medium storing computer executable instructions, and the processor, when running the computer executable instructions, performs the following operations:

generating pseudo manageable object change information in response to a user-initiated pseudo manageable object managing request, wherein a pseudo manageable object is a substitution for a manageable object in an offline processing, and a correspondence relationship between the pseudo manageable object and the manageable object is preset;

sending the pseudo manageable object change information to a target terminal having a communication connection with the terminal, wherein the pseudo manageable object change information is for changing status information of the pseudo manageable object of a login account of the terminal and status information of the pseudo manageable object of a login account of the target terminal;

changing the status information of the pseudo manageable object of the login account of the terminal based on the pseudo manageable object change information, and storing a change and a change of time of the status information of the pseudo manageable object as a change record in the login account of the terminal; and sending a manageable object update request to an online server and uploading the change record stored in the login account of the terminal to the online server when the terminal is detected to be connected to the online server, wherein the online server checks the status information of the pseudo manageable object of the login account of the terminal based on the change record, wherein the manageable object update request carries the login account of the terminal and the status information of the pseudo manageable object of the login account of the terminal, and the online server updates status information of the manageable object of the login account of the terminal stored in the online server based on a preset correspondence relationship in response to the manageable object update request.

6. The device according to claim 5, wherein the user-initiated pseudo manageable object managing request carries a value of the managed pseudo manageable object, and the processor generates the pseudo manageable object change information by:

obtaining an md5 value for the value of the pseudo manageable object, as the pseudo manageable object change information.

\* \* \* \* \*